United States Patent
Deal et al.

(10) Patent No.: US 9,141,400 B2
(45) Date of Patent: Sep. 22, 2015

(54) TECHNIQUE FOR DEPLOYING OPERATING SYSTEMS IN A VIRTUALIZED ENVIRONMENT

(71) Applicants: Gregory K Deal, Malvern, PA (US); J. Troy Stepan, Malvern, PA (US); Maureen Connell, Malvern, PA (US)

(72) Inventors: Gregory K Deal, Malvern, PA (US); J. Troy Stepan, Malvern, PA (US); Maureen Connell, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 13/944,938

(22) Filed: Jul. 18, 2013

(65) Prior Publication Data

US 2014/0181493 A1    Jun. 26, 2014

Related U.S. Application Data

(63) Continuation-in-part of application No. 13/944,933, filed on Jul. 18, 2013, now abandoned.

(60) Provisional application No. 61/740,711, filed on Dec. 21, 2012.

(51) Int. Cl.
   *G06F 9/445*    (2006.01)
   *G06F 9/44*    (2006.01)

(52) U.S. Cl.
   CPC ..................... *G06F 9/441* (2013.01)

(58) Field of Classification Search
   USPC .................................. 717/168–174; 709/203
   IPC ................................ G06F 8/60,8/61, 8/65, 8/70
   See application file for complete search history.

(56) References Cited

U.S. PATENT DOCUMENTS

| | | | | |
|---|---|---|---|---|
| 6,606,744 | B1 * | 8/2003 | Mikurak | 717/174 |
| 7,254,608 | B2 * | 8/2007 | Yeager et al. | 709/203 |
| 7,386,846 | B2 * | 6/2008 | Rajaram | 717/173 |
| 7,949,677 | B2 * | 5/2011 | Croft et al. | 707/781 |
| 8,095,525 | B2 * | 1/2012 | Le et al. | 707/705 |
| 8,205,194 | B2 * | 6/2012 | Fries et al. | 717/168 |
| 8,209,680 | B1 * | 6/2012 | Le et al. | 717/174 |
| 8,346,897 | B2 * | 1/2013 | Jaroker | 709/220 |
| 8,407,687 | B2 * | 3/2013 | Moshir et al. | 717/171 |
| 8,458,695 | B2 * | 6/2013 | Fitzgerald et al. | 718/1 |
| 8,527,982 | B1 * | 9/2013 | Sapuntzakis et al. | 717/174 |
| 8,601,170 | B1 * | 12/2013 | Marr et al. | 710/8 |
| 8,627,310 | B2 * | 1/2014 | Ashok et al. | 717/174 |
| 8,656,386 | B1 * | 2/2014 | Baimetov et al. | 718/1 |
| 8,745,614 | B2 * | 6/2014 | Banerjee et al. | 717/173 |
| 8,869,134 | B2 * | 10/2014 | Segalov | 717/173 |
| 8,887,144 | B1 * | 11/2014 | Marr et al. | 717/168 |
| 8,997,080 | B2 * | 3/2015 | Larkin et al. | 717/168 |

OTHER PUBLICATIONS

Richter et al, "Agentless Cloud-wide Streaming of Guest File System Updates", IEEE, pp. 7-16, 2014.*

(Continued)

*Primary Examiner* — Anil Khatri
(74) *Attorney, Agent, or Firm* — Richard J. Gregson

(57) ABSTRACT

A guest disk may be setup through the assistance of a restore environment. A restore environment may be bundled with partitioning software, and the restore environment may be a small, lightweight Linux™ environment that is operating-system agnostic. The restore environment allows any operating system image file to be deployed on the guest disk. The guest disk may be created through the use of virtualization software and a guest operating system.

19 Claims, 5 Drawing Sheets

(56) References Cited

OTHER PUBLICATIONS

Nicolae et al, "BlobCR: Efficient Checkpoint-Restart for HPC Applications on IaaS Clouds using Virtual Disk Image Snapshots" ACM, pp. 1-12, 2011.*

Jin et al, "The Effectiveness of Deduplication on Virtual Machine Disk Images", ACM, pp, 1-12, 2009.*

Basu et al, "LVD: Lean Virtual Disks", ACM, pp. 25-36, 2014.*

* cited by examiner

TECHNIQUE FOR DEPLOYING OPERATING SYSTEMS IN A VIRTUALIZED ENVIRONMENT

CROSS REFERENCE TO RELATED APPLICATIONS

This non-provisional patent application is a continuation-in-part of U.S. patent application Ser. No. 13/944,933, entitled "An Improved Technique for Deploying Operating Systems in a Virtualized Environment," and filed on Jul. 18, 2013, which claims priority to Provisional Patent Application Ser. No. 61/740,711, entitled "An Improved Installation Sequence for CSE," and filed Dec. 21, 2012, the entire contents of which are hereby incorporated herein by reference.

TECHNICAL FIELD

The present invention relates generally to an operating system installation, and more particularly, to an operating system agnostic method for installing multiple types of operating systems on computer hardware.

BACKGROUND

Servers and personal computers often rely on the Microsoft™ Windows™ operating system to execute applications and services. Depending on the Microsoft™ Windows™ edition, multiple licenses may be required for the same computer if multiple instances of Windows™ are loaded onto different partitions on virtual machines sharing the same hardware platform. A partition of a server may be a Unisys Specialty Engine (or "guest"), a general purpose partition, or any other type of partition. For example, a partition of a computer may be created using virtualization tools.

Installing Windows™ on a storage array conventionally requires Microsoft™ created tools for installation. For example, to install and configure a Windows™ operating system on a partition, a computer may use a separate partition or restore environment running the Enterprise Edition of Windows™ to provide an environment capable of setting up and installing guest operating system images by using standard Windows™ disk partitioning (diskpart.exe) and disk imaging tools (imagex.exe) provided by Microsoft™ for OEM image deployment. So, deploying a Windows™ operating system image on a guest partition or guest disk requires a separate Windows™ environment to run on the platform, such as the Enterprise version of Windows™ installed on a designated restore partition. In other words, a single computer may need two or more licenses from Microsoft™ to run the guest partitions in order to properly license the Windows™-based restore environment. Companies that manufacture and sell computers typically do not want to buy additional licenses from Microsoft™, especially if a license will only be used to instantiate the guest partitions. These companies may purchase dozens, hundreds, or thousands of Windows™ licenses from Microsoft™ for the installation of guest partitions. Thus, a tool is desired to reduce the Microsoft™ license requirements in order to lower licensing costs.

Also, as mentioned above, deploying the Windows™ operating system images conventionally requires Microsoft™ tools. Because Microsoft™ designed their tools to only install operating systems created by Microsoft™, these installation tools are operating system-specific. Operating system-specific tools may limit a company's deployment flexibility because only Windows™-compatible applications may be used. Some companies may wish to use, for example, Linux™-based environments, Linux™ operating systems are based on open-source software and may be requested by the customer because of interoperability with the customer environment, reduced licensing fees or Independent Software Vendor (ISV) support requirements. Given all these factors, companies may desire a computing platform capable of deploying and running both Windows™ and Linux™ guest partitions (or potentially other operating systems, like FreeBSD). So, a set of operating system agnostic installation tools are desired.

The systems and methods described herein attempt to overcome the drawbacks discussed above by bundling a restore environment with partitioning software. The restore environment may be a small, lightweight Linux™ environment that is operating system-agnostic so that any operating system image file which has been previously captured may be deployed on a guest disk on demand.

In one embodiment, a method of creating and capturing a guest disk image comprises: creating, by a computer, a plurality of virtual disks from a single storage array, wherein the virtual disks include at least one virtualization software disk and at least one guest disk; installing, by a computer, virtualization software onto the at least one virtualization software disk, wherein the virtualization software bundles a virtualization software console and a restore environment; installing, by a computer running the virtualization software, a guest operating system that bundles virtualization drivers onto the guest disk; booting, by a computer running the virtualization software, the guest operating system through the virtualization software console; configuring, by a computer, settings of the guest operating system depending on applications or services offered by the guest disk; booting, by a computer running the virtualization software, the restore environment from the virtualization software console; capturing, by a computer, a guest disk file system into a disk image file; and saving, by a computer, the disk image file to the at least one virtualization software disk.

In another embodiment, a method of deploying a guest disk comprises: launching, by a computer, a virtualization software, wherein the virtualization software includes a bundled restore environment; booting, by a computer, the restore environment; downloading, by a computer, a compressed image file from a storage disk; expanding, by a computer, the compressed image file directly onto the guest disk using a script run within the restore environment; and configuring, by a computer, boot settings to boot the installed guest disk operating system instead of the restore environment.

In another embodiment, a computer system comprises: at least one processor; a memory; physical data storage hardware, wherein the physical data storage hardware includes at least one guest partition disk and at least one virtualization software disk; and a virtualization software, installed on the virtualization software disk, configured to partition computer hardware resources and install an operating system on the virtual guest disk, wherein the virtualization software includes a restore environment that runs in a portion of the block of memory, and the restore environment is configured to capture and deploy a guest disk image of an operating system installed on the guest disk.

In another embodiment, a method of creating and capturing a guest disk image comprises: creating, by a computer, a plurality of virtual disks from a single storage array, wherein the virtual disks include at least one virtualization software disk and at least one guest disk, and wherein the at least one guest disk is minimally sized to accommodate operating system and data files and minimize unused space; installing, by a computer, virtualization software onto the at least one virtualization software disk, wherein the virtualization software bundles a virtualization software console and a restore environment; partitioning, by a computer running the virtualization software, the guest disk into at least an operating system (OS) partition and a data partition; installing, by a computer running the virtualization software, a guest operating system that bundles virtualization drivers onto the OS partition of the guest disk; booting, by a computer running the virtualization software, the guest operating system through the virtualization software console; configuring, by a computer, settings of the guest operating system depending on applications or services installed on the guest disk; booting, by a computer running the virtualization software, the restore environment from the virtualization software console; capturing, by a computer, a guest disk file system of the OS partition into a first disk image file and a guest disk file system of the data partition into a second image file; and saving, by a computer, the first and second disk image files to the at least one virtualization software disk.

In another embodiment, a method of deploying a guest disk comprises: creating, by a computer, a plurality of virtual disks from a storage array, wherein the virtual disks include at least one guest disk; partitioning, by a computer, each virtual disk into at least an operating system (OS) partition and a data partition; launching, by a computer, a virtualization software, wherein the virtualization software includes a bundled restore environment; booting, by a computer, the restore environment; downloading, by a computer, a OS partition image file and a data partition image file from a storage disk, wherein the OS partition image file and the data partition image file are smaller than a final customer system's OS and data partitions; expanding, by a computer, the OS partition image file directly onto the guest disk's OS partition using a script run within the restore environment to create an OS file system; expanding, by a computer, the data partition image file directly onto the guest disk's data partition using a script run within the restore environment to create a data file system; and resizing, by a computer, an OS file system and the data file system to access unused portions of the OS and data partitions based on the size of the final customer system's OS and data partition.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Reference will now be made in detail to the preferred embodiments, examples of which are illustrated in the accompanying drawings.

The embodiments described above are intended to be exemplary. One skilled in the art recognizes that numerous alternative components and embodiments may be substituted for the particular examples described herein and still fall within the scope of the invention.

Figure 1:
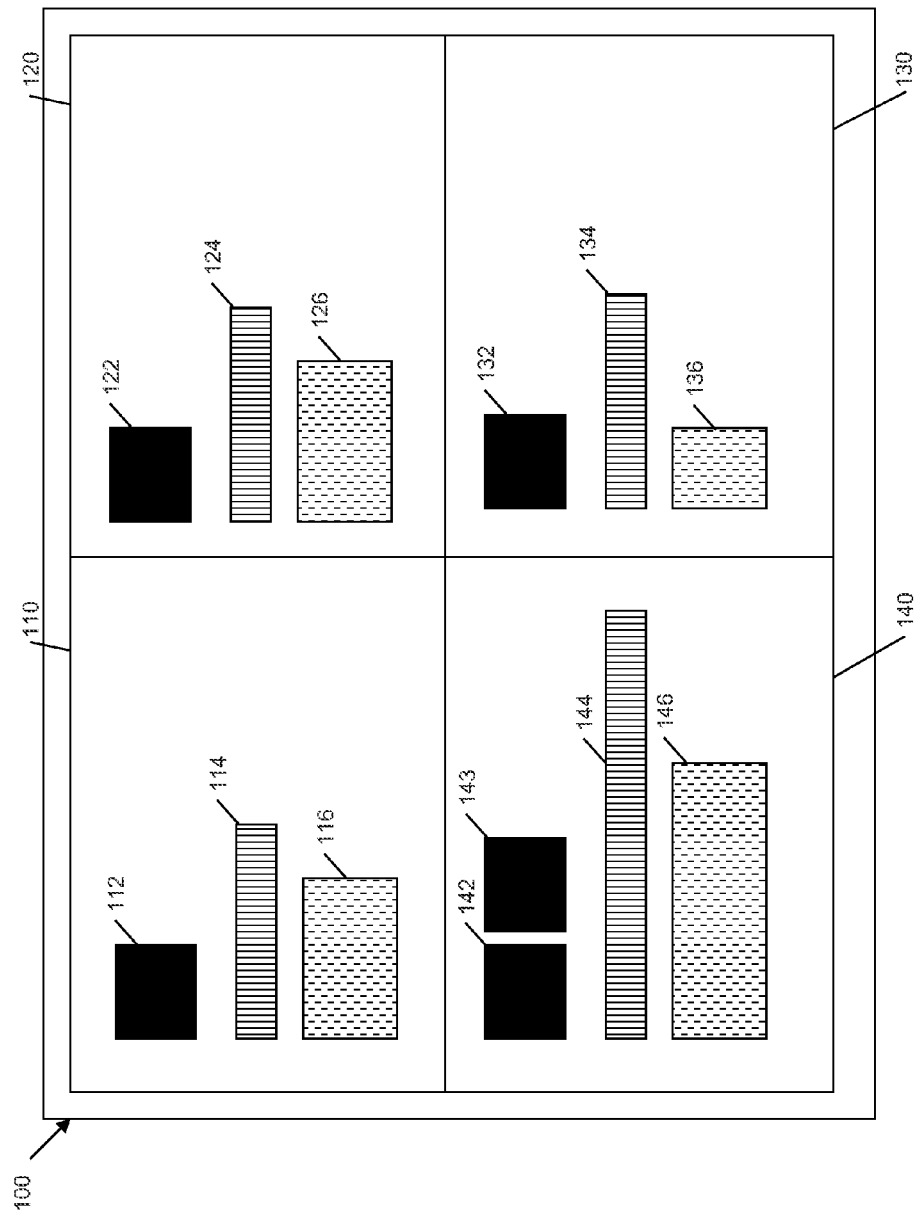
FIG. 1 illustrates a computer system diagram with virtualized partitions according to an exemplary embodiment.

Referring to FIG. 1, a computer system 100 is illustrated. The computer system 100 may include computer hardware in the form of processors, memory, data storage, input/output devices, data buses, display adapters, display devices, network adapters, and many other pieces of computer hardware. The computer system 100 may be a personal computer, a server, or any other type of computer system capable of processing digital data. The computer system 100 includes four partitions 110, 120, 130, 140, and the computer system 100 allocates computer resources to each partition 110, 120, 130, 140. Each partition 110, 120, 130, 140 may be created to perform a specific task. For example, the fourth partition 140 may be a centralized processing complex, and the first through third partitions 110, 120, 130 may perform specific applications, such as legacy applications, web services, or Java™ application deployment. If a partition performs a specific application, the partition may be called a specialty engine, or a "guest." While four partitions are illustrated in FIG. 1, more or fewer partitions may be created.

Each partition 110, 120, 130, 140 has computer resources, which the computer system 100 allocated. The amount of computer resources allocated depends on what applications or tasks each partition 110, 120, 130, 140 performs. For example, each partition has one or more processors 112, 122, 132, 142, 143, an allocated block of memory 114, 124, 134, 144, and an allocated block of physical storage 116, 126, 136, 146. The computer system 100 may allocate other computer hardware resources to the partitions 110, 120, 130, 140, but these resources are not illustrated in FIG. 1. As shown in FIG. 1, the fourth partition 140 received more allocated resources than the other partitions (two processors, a larger block of memory, and a larger block of physical storage). As mentioned above, the fourth partition 140 can be a central processing complex. Central processing may require more resource-intensive applications and processes, and as such, more computer resources are allocated to efficiently perform such tasks. As a further example, the applications performed by the third partition 130 may require less physical storage 116, 126 than the applications performed by the first and second partitions 110 and 120, so the computer system 100 allocates less physical storage to the third partition 130, which is represented in FIG. 1 by the size of the rectangle representing the physical storage 116, 126.

The computer system 100 creates virtualized RAID disks. The computer system 100 may have one or more internal disks (for example, hard drives or solid state drives) for physical storage. If the computer system 100 has more than one internal disk, the internal disks may be configured into a single RAID. After creating a RAID of any RAID level, the array may be virtualized to appear as multiple, independent disks, sometimes referred to as virtual disks. Each of these virtual disks shares the same performance and reliability benefits as all other virtual disks in the RAID, and of the RAID itself. The computer system 100 creates the virtual disks to have varying sizes and specifications. The size and specification of each virtual disk depends on the specific guest operating system that will be deployed. The virtualization software used to partition the computer resources (such as processor, memory, I/O devices) may be different than the configuration utility used to create the RAID and the virtual disks. For example, a vendor supplied configuration utility may create the RAID and the virtual disks. Alternatively, the virtualization software may include tools to facilitate RAID and virtual disk creation.

Each partition may be created using virtualization software, such as the Unisys solution s-Par™. Virtualization software may also assist in installing an operating system on each partition, or guest 110, 120, 130, 140. S-Par™ may be installed as firmware of the computer system 100. In addition, s-Par™ files, platform tools, and guest installation files, such as operating system images, data files, etc. may be loaded on at least one virtual disk or divided amongst any number of virtual disks. In other words, at least one disk may be reserved for s-Par™ to operate and implement the s-Par™ environment. For example, the s-Par™ virtualization software may reside on the first virtual disk 110, whereas the guest installation files may reside on the second virtual disk 120. While s-Par™ has been and will be described as the virtualization software, the computer system 100 may use any virtualization or partitioning solution to create guest operating systems or Specialty Engines.

Each partition 110, 120, 130, 140 may have a separate operating system. For example, each guest partition 110, 120, 130, 140 may have a distinct copy of Windows™. In another example, some or all of the guest partitions 110, 120, 130, 140 may have Linux™ installed. The operating system installed on guest partitions 110, 120, 130, 140 depends on the intended application of the guest partition. As a result of the partitioning, the operating systems and guest environments run on top of the virtualization technology. For improved performance, the operating system may be stripped of non-essential functionality depending on the intended usage of the guest.

The computer system 100 partitions the resources and installs an operating system on each partition using s-Par™ tools and possibly operating system specific tools. The process of partitioning, installing, and capturing an operating system on a partition is described in detail below with reference to FIG. 2.

Figure 2:
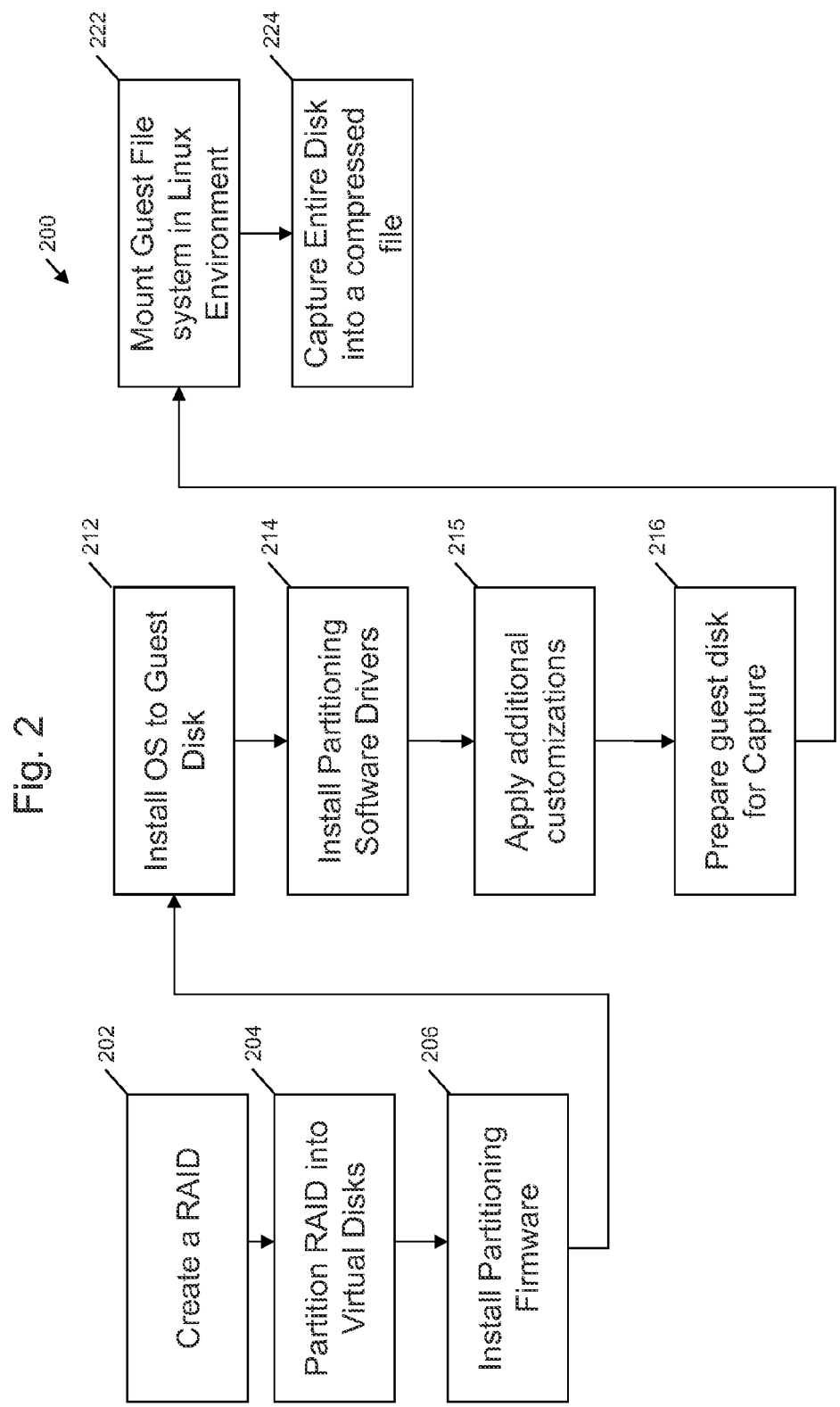
FIG. 2 illustrates a method of creating specialty engines on a virtualized partition according to an exemplary embodiment.

With reference to FIG. 2, the method 200 begins with step 202 when the configuration utility is used to create a RAID. As described above, the configuration utility is used to configure two or more internal disks into a single RAID.

After the RAID is created in step 202, the configuration utility is used to allocate disk space from the RAID to create virtual disks in step 204. The virtual disks inherit the performance and reliability benefits of the RAID.

Once the computer system has a plurality of virtual disks, the computer may install the virtualization software in step 206 so that the computer system may run the virtualization solution. As described above, the virtualization software may be embodied by the Unisys solution s-Pai™. When installing s-Par™ software, s-Par™ files are loaded on to one or more dedicated s-Par™ virtual disks. For example, s-Par™ may use live virtual disks as an s-Par™ disk set. S-Par™ files, platform tools, and guest installation files, such as operating system images, data files, etc., are loaded onto the s-Par™ disk set. The creation of guest installation files will be described in greater detail below.

If the operating system to be installed on the guest disk is Windows™, the computer system boots into the Windows™ Preinstallation Environment (WinPE, WinPE is a minimal operating system used to prepare a computer for Windows™ installation, Once WinPE boots, standard Windows™ disk partitioning and imaging tools are used to partition the guest disk with the final product required sized disk partitions. For example, WinPE may set up a two hundred megabyte EFI System Partition (ESP), a one hundred and twenty eight megabyte Microsoft™ Reserved partition, a thirty gigabyte (GB) C: partition and a fifty GB D: partition. This may only be required when the Windows™ operating system is to be installed on the guest disk. Other operating systems may need to set up the guest disk, and some operating systems may skip this step. Guest disk set up is operating system specific, so a determination must be made as to whether the guest disk needs to be set up before installing a particular operating system. Generally, operating system specific tools perform disk set up according to vendor-provided methods, so further description of disk set up is omitted.

Both Windows™ and Linux™ require step 212, and the computer system installs Linux™ or Windows™ to the guest disk. To install the operating system, the computer system may receive a reboot command from an operator, and after the computer reboots, the computer system installs the designated operating system. Alternatively, in the case of a Windows™ guest, a previously created operating system image may be deployed from WinPE using standard Windows™ disk imaging tools. Installation of an operating system may be accomplished by operating system specific tools. For example, the computer system receives operating system data by booting from a removable piece of media, such as a CD/DVD-ROM, Flash disk, or PXE network installation and starting an installation tool bundled with the operating system media. The installation may proceed interactively or non-interactively and typically results in a complete, running operating system when completed. After installation, the computer system may receive a command from an operator to install software applications, harden the security settings, remove unnecessary components, or otherwise customize the operating system during step 212 through manual or scripted methods.

After the selected operating system is installed on the guest disk, the computer starts s-Par™ (for another partitioning tool). From the s-Par™ console, the guest operating system is booted. The s-Par™ console allows a user to manage created virtual disks (the guest disks described above). From the s-Par™ console, guest disks may be booted, and multiple guest disks may be booted in parallel from the s-Par™ console. The s-Par™ console provides users with many customization and partitioning options.

The s-Par™ virtualization software may include an integrated operating system. For example, a small, lightweight Linux™ environment may be bundled with s-Par™. Each guest partition can boot the lightweight version of Linux™ on demand. In other words, this lightweight Linux™ environment runs in the context of each guest. The lightweight version of Linux™ may be called a restore environment. The restore environment runs completely in memory and does not rely on any content stored on the guest disk. This restore environment runs scripts and performs the necessary steps to download, extract and write a disk image, which may be compressed, to the guest disk. Linux™ is an ideal operating system for the restore environment because Linux™ is open source, can be customized to be light weight, requires no additional Windows™ licenses to purchase or install, and can be pre-loaded with tools that are well-suited for the tasks of installing the guest partition. Linux™ tools are operating system-agnostic, so the restore environment can mount either Windows™ or Linux™ file systems and make further changes after the disk image has been written to disk. The restore environment according to the exemplary embodiments may load, other operating systems, such as FreeBSD, a Unix derived operating system. For illustration, purposes, Linux™ and Windows™ will be described as the operating systems loaded onto the guest disks.

Once the guest operating system is booted from the s-Par™ console, the computer may display the guest environment to a user. Once executing the guest environment, the computer may receive a command from the operator to update to the latest version of s-Par™ drivers to the guest operating system in step 214. The s-Par™ drivers allow the guest operating system to communicate with and use computer hardware through the s-Par™ virtualization services, and the drivers are included in the compressed disk image so that the guest can function properly. The operator may also install other software products to the guest environment, configure security of the guest environment, and modify settings of the guest environment in step 215. The security, settings, and additional software may depend on the services to be provided by the guest environment. For example, if the guest disk is a Specialty Engine, the operator may install Java™ software and a proprietary communications interconnect. Each service offered by the Specialty Engine may require different configurations and settings for optimal performance.

After all the drivers and software have been installed on the guest disk, the guest disk is ready for capture. The sequence of capturing the guest disk saves an image of the created guest environment. The image may be a compressed disk image file. When the created guest environment is ready for deployment, s-Par™ loads the guest image onto a guest disk. Once loaded and started, the guest OS performs desired processes and offers designated services. Each guest OS may perform a slightly different function. So, by storing many different guest disk images, the computer system can deploy many different services on demand and at optimal configuration.

Operating system specific tools prepare the guest disk for capture in step 216. For example, Windows™ may use the Microsoft™'s System Preparation tool ("sysprep"), Linux™ images may be captured using Linux™ tools or scripts. The preparation may include removing identification data or drivers.

The computer system may receive a command from the operator that is based on the operating system type. If the guest operating system type is Windows™, the computer system may receive a command from the operator to boot into WinPE and capture the guest file systems using standard Microsoft™ disk imaging tools, such as ImageX or tools included with, or compatible with, WinPE. The computer system verifies the integrity of the capture by reinitializing the guest disk, and then applies the captured image file(s) to the guest disk, which creates a new GUID (globally unique identifier) Partition Table (GPT). The computer system may randomize the GPT disk and partition GUIDs for uniqueness when creating new the GPT. The above actions may be skipped if the operating system is not Windows™.

To capture a non-Windows™ guest, the computer system receives a command from the operator and boots a separate Linux™ environment in step 222. From this Linux™ environment, which can be instantiated through optical media, USB media, PXE, or from an installed operating system located on one of the virtual disks, the computer system receives a command from the operator to locate the guest disk, and the computer system mounts one or more of the guest file systems. The computer system may further receive a command from, the operator to remove temporary files on the guest file systems and zero-out the unused file system space to reduce the final size of the compressed disk image.

After any operating system has been prepared for capture, standard Linux™ tools are used to capture the entire guest disk into a compressed file in step 224. The capture is a raw, disk dump of the entire disk including the GPT header and all partitions and all file systems. Because the Linux™ tools used are operating system and file system agnostic, both unused areas of the guest disk and the empty file system blocks are captured into the compressed file. A copy of the compressed image is saved to the s-Par™ disk set. The operating system image can be deployed on one or more guest partitions.

As shown through the method 200, the computer system performs a method of creating and capturing a guest disk. This method may utilize Microsoft™ or open-source tools depending on the guest type. So Linux™, Windows™, or other operating system may be captured from a guest disk. The computer system offers flexibility to customers and provides more solutions.

Figure 3:
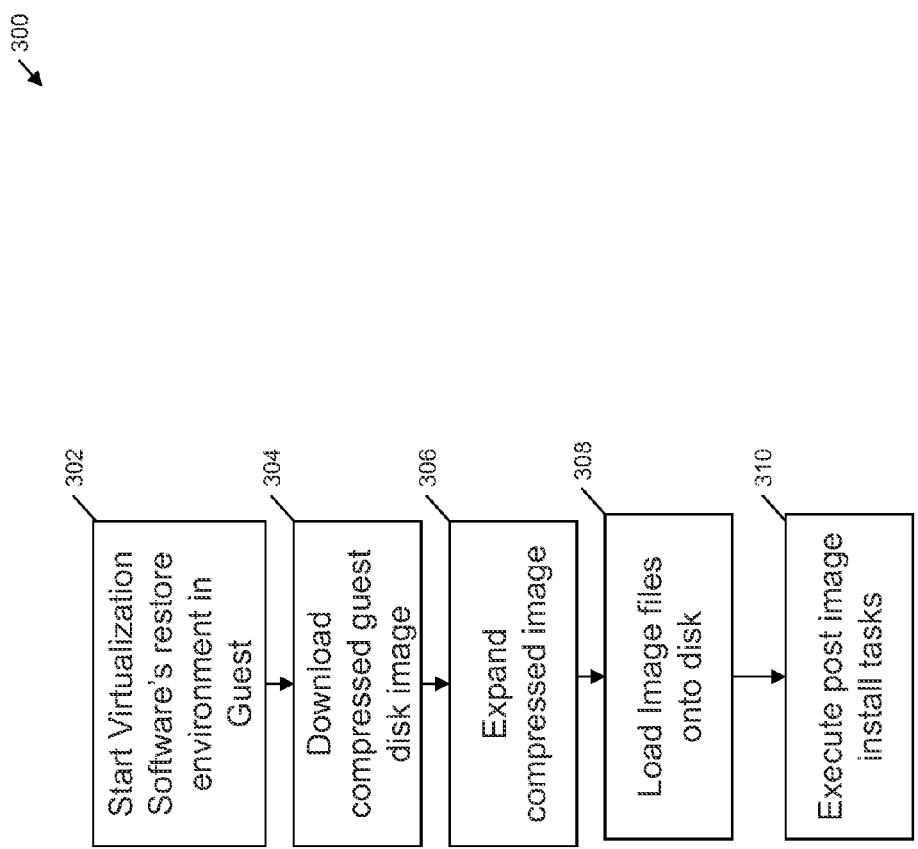
FIG. 3 illustrates a method of setting up a new system according to an exemplary embodiment.

The method 200 described the process of creating and capturing a guest disk. The computer system saves the captured guest disk as a compressed file. The computer system can then deploy the image onto a guest disk. FIG. 3 illustrates the process of deploying a saved guest disk image.

A method 300 of deploying a saved guest disk image begins in step 302 when the computer system starts the virtualization software, which may be s-Par™.

The restore Linux™ environment deploys the compressed file, which is the captured disk dump of the guest disk. The restore Linux™ environment deploys the guest disk by downloading the compressed file in step 304. The restore Linux™ environment uses a utility that expands the compressed file, which occurs in step 306, and the utility expands a download stream of the downloaded compressed file directly onto the guest disk in step 308. This utility may be included as part of the virtualization software and may be embodied by a shell script. The shell script may copy one or more files from the s-Par™ disk set to the guest disk. This process loads all data from the compressed file onto the guest disk, including unused areas of the disk.

After a guest disk is deployed, the guest partition restarts and virtualization software detects and boots the Guest OS instead of the restore Linux™ environment. Additional steps such as entering a system name, a product key, etc. may be performed after booting the guest OS.

The restore Linux™ environment may be instantiated on multiple guest partitions in parallel and then subsequently be used to download, extract and install multiple guest partitions in parallel. For example, one restore environment may be deploying a Windows™ operating system image at the same time while another restore environment deploys a Linux™ operating system image. By installing guest disks in parallel, the time to set up a new system and deploy Specialty Engines is reduced. Also, the dependence on Microsoft™ proprietary tools is reduced.

The restore Linux™ environment is capable of deploying multiple operating system types. The same techniques are used for all types and therefore the restore environment is operating system agnostic. The computer system offers greater flexibility and capability by offering Specialty Engines that are based on Linux™, Windows™, or other operating systems.

Figure 4:
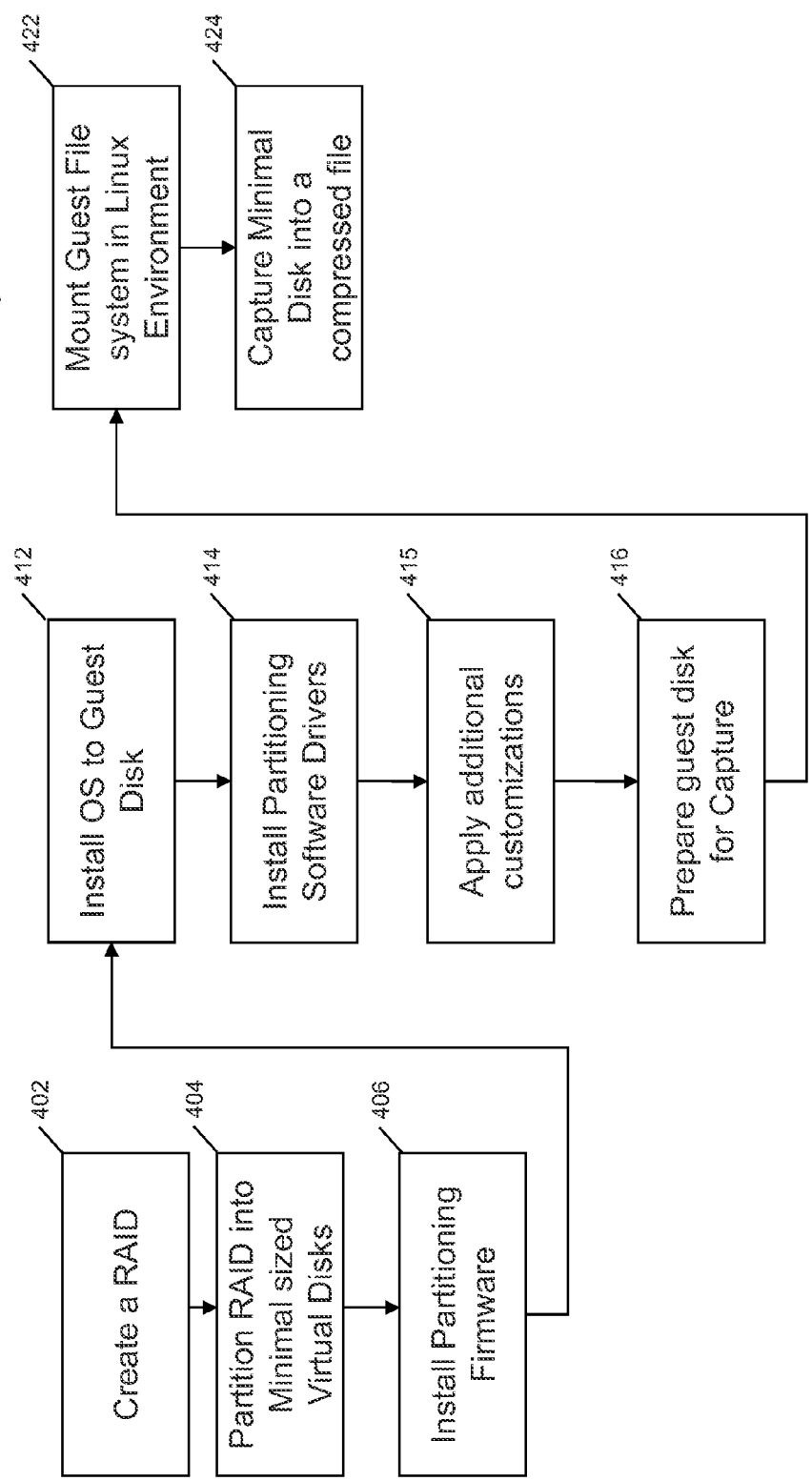
FIG. 4 illustrates a method of creating specialty engines on a virtualized partition according to a second exemplary embodiment.

With reference to FIG. 4, a method 400 according to another embodiment begins with step 402 when the configuration utility is used to create a RAID. As described above, the configuration utility is used to configure two or more internal disks into a single RAID. All of the steps in FIG. 4 may be performed on a development machine, which may not have identical technical specifications as a final customer system. For example, in the embodiment shown in FIGS. 4 and 5, the development machine may have reduced hardware specifications when compared to the final customer system. In this embodiment, the development machine may preferably have less physical disk space than the development machine of the embodiment shown in FIGS. 2 and 3. So, the RAID created as a result of step 402 may have less physical storage space than the RAID created in FIG. 2.

After the RAID is created in step 402, the configuration utility is used to allocate disk space from the RAID to create virtual disks in step 404. The virtual disks inherit and share the performance and reliability benefits of the RAID. The virtual disks created in step 404 are not equivalently sized to the virtual disks included in the final customer system. The virtual disks created by step 404 are preferably smaller than the guest disks of the final customer system so that capturing a virtual disk on the development machine and deploying the virtual disk on the final customer system requires less time and uses less resources. In this way, the virtual disks created in step 404 are minimally sized to include enough space necessary for the operating system data and virtual disk specific data and minimal unused space. For example, a virtual disk created in FIG. 2 may be over 150 GB in size, whereas a virtual disk created by the method according to the second embodiment may be only about 20-45 GB in size, but the size of the virtual disk should not be limited to 20-45 GB. For example, as operating systems and application data becomes more sophisticated, the software may use more physical storage. So, the virtual disk size must scale with the size of desired operating systems and applications.

The development machine comprises a plurality of virtual disks, the development machine may install the virtualization software in step 406 so that the development machine may run the virtualization software. As described above, the virtualization software may be embodied by the Unisys solution s-Par™. When installing s-Par™ software, s-Par™ files are loaded on to one or more dedicated s-Par™ virtual disks on the development machine. For example, s-Par™ may use five virtual disks as an s-Par™ disk set. S-Par™ files, platform toots, and guest installation files, such as operating system images, data files, etc., are loaded onto the s-Par™ disk set. The creation of guest installation files will be described in greater detail below.

If the operating system to be installed on the guest disk is Windows™, the development machine boots into WinPE, Once WinPE boots, standard Windows disk partitioning and imaging tools are used to perform a number of tasks in preparation for installing a new operating system. From WinPE, the virtual disk may be cleaned to delete any files, partitions, or file systems on the virtual disk. After cleaning the virtual disk, WinPE partitions the virtual disk, which includes an operating system (OS) partition and a data partition. Operating system files may be installed on the OS partition, while data and application files may be installed on the data partition. The sizes of the OS partition and the data partition are minimally sized to minimize unused space on the virtual disk. For example, WinPE may set up a two hundred megabyte EFI System Partition (ESP), a one hundred and twenty eight megabyte Microsoft™ Reserved partition, a twenty GB OS partition and a twenty GB data partition. Other operating systems may need to set up the guest disk, and some operating systems may skip this step. Guest disk set up is operating system specific, so a determination must be made as to whether the guest disk needs to be set up before installing a particular operating system. Generally, operating system specific tools perform disk set up according to vendor-provided methods, so further description of disk set up is omitted.

After partitioning the virtual disk, the development machine installs an operating system to the virtual, or guest, disk. To install the operating system, the development machine may receive a reboot command from an operator, and after the development machine reboots, the development machine installs the designated operating system. Alternatively, in the case of a Windows™ guest, a previously created operating system image may be deployed from WinPE using standard Windows™ disk imaging tools. Installation of an operating system may be accomplished by operating system specific tools. For example, the development machine receives operating system data by booting from a removable piece of media, such as a CD/DVD-ROM, Flash disk, or PXE network installation and starting an installation tool bundled with the operating system media. The installation may proceed interactively or non-interactively and typically results in a complete, running operating system when completed. After installation, the development machine may receive a command from an operator to install software applications, harden the security settings, remove unnecessary components, or otherwise customize the operating system during step 412 through manual or scripted methods.

After the selected operating system is installed on the virtual disk, the development machine starts s-Par™ (or another partitioning tool). From the s-Par™ console, the guest operating system is booted. The s-Par™ console allows a user to manage created virtual disks (the guest disks described above). From the s-Par™ console, guest disks may be booted, and multiple guest disks may be booted in parallel from the s-Par™ console. The s-Par™ console provides users with many customization and partitioning options.

The s-Par™ virtualization software may include an integrated operating system. For example, a small, lightweight Linux™ environment may be bundled with s-Par™. Each guest partition can boot the lightweight version of Linux™ on demand. In other words, this lightweight Linux™ environment runs in the context of each guest. The lightweight version of Linux™ may be called a restore environment. The restore environment runs completely in memory and does not rely on any content stored on the guest disk. This restore environment runs scripts and performs the necessary steps to download, extract, and write a disk image, which may be compressed, to the guest disk. These tools are operating system-agnostic, so the restore environment can mount either Windows™ or Linux™ file systems and make further changes after the disk image has been written to disk. The restore environment according to the exemplary embodiments may load other operating systems, such as FreeBSD, a Unix derived operating system.

Once the guest operating system is booted from the s-Par™ console, the development machine may display the guest environment to a user. Once executing the guest environment, the development machine may receive a command from the operator to update to the latest version of s-Pa™ drivers to the guest operating system in step 414. The s-Par™ drivers allow the guest operating system to communicate with and use computer hardware through the s-Par™ virtualization services, and the drivers are included in the compressed disk image so that the guest can function properly. The operator may also install other software products to the guest environment, configure security of the guest environment, and modify settings of the guest environment in step 415. The security, settings, and additional software may depend on the services to be provided by the guest environment. For example, if the guest disk is a Specialty Engine, the operator may install Java™ software and a proprietary communications interconnect. Each service offered by the Specialty Engine may require different configurations and settings for optimal performance.

After all the drivers and software have been installed on the guest disk, the guest disk is ready for capture. The sequence of capturing the guest disk saves an image of the created guest environment, which may be a compressed disk image file. When the created guest environment is ready for deployment, s-Par™ loads the guest image onto a guest disk on the final customer system. Once loaded and started, the guest OS performs desired processes and offers designated services. Each guest OS may perform a slightly different function. So, by storing many different guest disk images, a final customer computer system can deploy many different services on demand and at optimal configuration.

Operating system specific tools prepare the guest disk for capture in step 416. For example, Windows™ may use the Microsoft™'s System Preparation tool ("sysprep"). Linux™ images may be captured using Linux™ tools or scripts. The preparation may include removing identification data or drivers.

The development machine may receive a command from the operator that is based on the operating system type. If the guest operating system type is Windows™, the development machine may receive a command from the operator to boot into WinPE and capture the guest file systems using standard Microsoft™ disk imaging tools, such as ImageX or tools included with, or compatible with, WinPE. The development machine verifies the integrity of the capture by reinitializing the guest disk, and then applies the captured image file(s) to the guest disk, which creates a new GUM (globally unique identifier) Partition Table (GPT). The development machine may randomize the GPT disk and partition GUIDs for uniqueness when creating new the GPT. The above actions may be skipped if the operating system is not Windows™.

When using WinPE, the process of capturing the guest file system may involve capturing the guest file system into a compressed file called a .wim file. This capture command operates on the file level, and only references to actual files/directories are included in the capture. Any unused space of the file system does not affect the capture. After creating the .wim file, the .wim file is reapplied to a previously zeroed partitioned guest disk having a file system, but all the data on the file system has the value zero. So, any unused areas of the disk have a value of zero.

Subsequently, the development machine boots into the Linux™ Restore environment. From this Linux™ environment, which can be instantiated through optical media, USB media, PXE, or from an installed operating system located on one of the virtual disks, the development machine receives a command from the operator to locate the guest disk, and the development machine mounts one or more of the guest file systems in step 422. The development machine may further receive a command from the operator to remove temporary files on the guest file systems and zero-out the unused file system space to reduce the final size of the compressed disk image. Or, as described above, the unused space may be zero.

After any operating system has been prepared for capture, standard Linux™ tools are used to capture the guest disk into a compressed file in step 424. The capture command captures each individual partition of the guest disk (OS partition, data partition, or any other partition) into a compressed file. By capturing each partition into a compressed file, multiple partitions of one guest disk may be captured in parallel, which decreases the time necessary to capture a guest disk. Also, because the virtual disks were created to be minimally sized, the compressed files capture very little, if any, unused space. Also, the development machine using the second embodiment method is capturing less data than the first embodiment. Further still, multiple compressed files capturing a guest disk results in easier generation and updating of guest install data because not all partitions would need to be remade, resulting in less engineering time. As one further advantage, the compressed file, which may be a GZip file (.gz), is smaller in size because it represents less data. This advantage saves storage space and transfer time both within deployment, factory, and virtualized environments when creating guest disks.

A copy of the compressed image is saved to the s-Par™ disk set. The operating system image can be deployed on one or more guest partitions.

Figure 5:
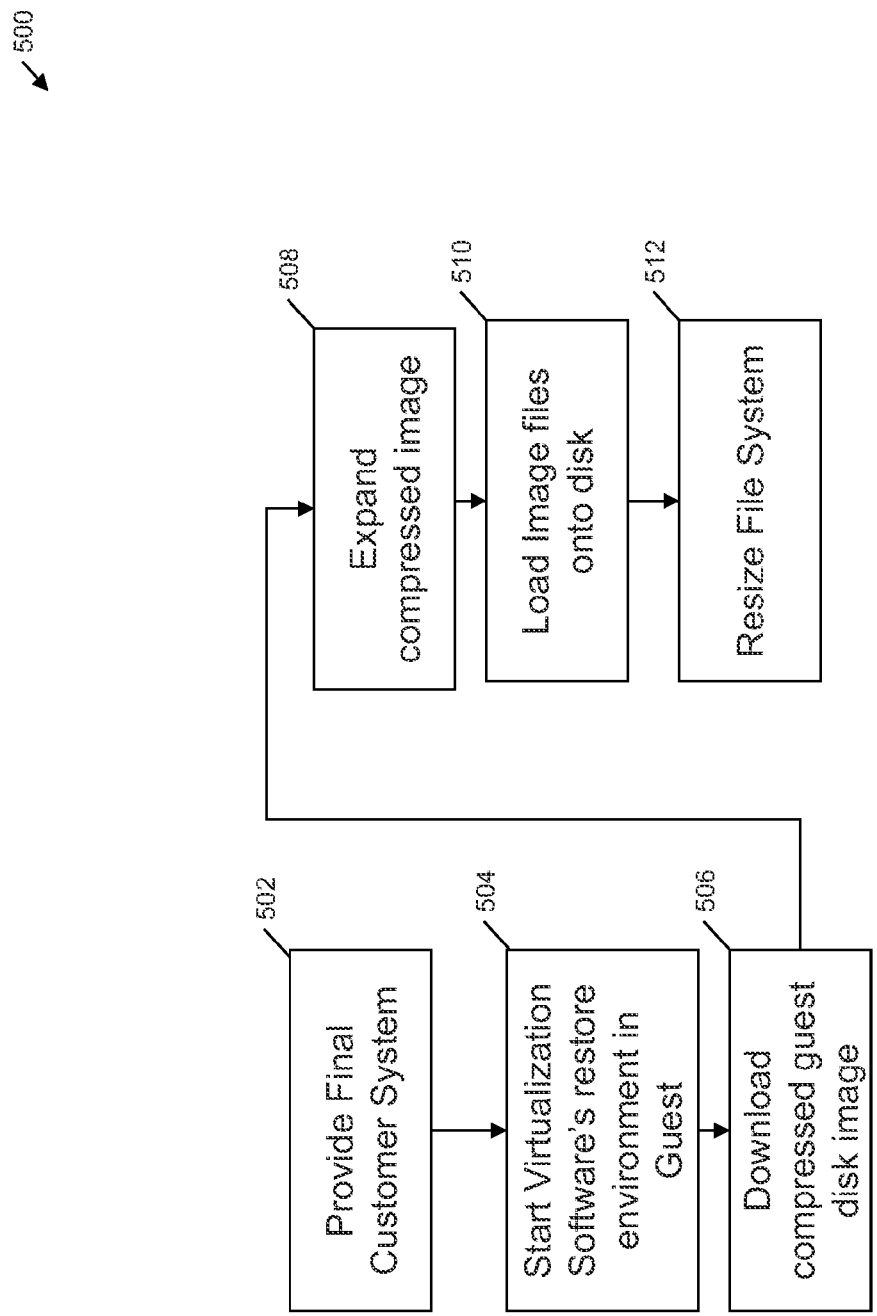
FIG. 5 illustrates a method of setting up a new system according to a second exemplary embodiment.

The method 400 described the process of creating and capturing a guest disk. The development machine saves the captured guest disk as a compressed file. The development machine can then deploy the image onto a guest disk. FIG. 5 illustrates the process of deploying a saved guest disk image onto a final customer system.

A method 500 of deploying a saved guest disk image begins in step 502 when a final customer system is provided. Providing a final customer system may involve setting up a computer system for distribution and deployment, or the final computer system may come pre-configured. The final customer system may include a number of physical disks combined and configured into virtual disks using the configuration utility (i.e. RAID), which is similar to steps 402 and 404 in FIG. 4. The steps of setting up virtual RAID guest disks may happen before the steps shown in FIG. 5. After receiving, preparing, or providing a final customer system, the final customer system starts the virtualization software, which may be s-Par™ in step 504.

The restore Linux™ environment performs the steps of deploying the compressed files, which were created in the method of FIG. 4. The restore Linux™ environment deploys the guest disk by downloading the compressed files in step 506. The restore Linux™ environment uses a utility that expands the compressed files, which occurs in step 508, and the utility expands a downloaded stream of compressed files directly onto the guest disk in step 510. This utility may be included as part of the virtualization software and may be embodied by a shell script. The shell script may copy one or more files from the s-Par™ disk set to the guest disk. This process loads all decompressed data from the compressed files onto the guest disk, including unused areas of the disk.

Because the compressed files represent very little unused space, or at least substantially less unused space that the method of FIGS. 2 and 3, the amount of time necessary to apply the operating system files to the guest disk requires substantially less time. The amount of time taken to uncompress the compressed file also requires less time because less data needs to be expanded. So, the amount of time to perform the method of FIG. 5 requires substantially less time than the method of FIG. 3.

Because the amount of data applied to the final customer system guest disk is substantially less data than the total size of the final customer system guest disk, each guest disk partition's file system may be resized in step 512 to access unused partition space, allowing the OS to use all disk space, and make the operating system aware of all guest disk space. For example, the virtual guest disk on the development machine may be 45 GB, and the compressed file represents the 45 GB. However, a final customer system may have a guest disk that is substantially larger, such as 160 GB. After applying the compressed file to the final customer system guest disk, the file system is resized to recognize all 160 GB of the final customer system guest disk. More specifically, both the an operating system (OS) file system and a data file system are resized. For example, the OS file system may be expanded to 50 GB and the data file system may be resized to 110 GB.

After a guest disk is deployed, the guest partition restarts and virtualization software detects and boots the guest OS instead of the restore Linux™ environment. Additional steps such as entering a system name, a product key, etc. may be performed after booting the guest OS.

Because smaller partitions and smaller data files are being created, captured, compressed, verified/tested, downloaded, expanded, and loaded, the time taken to perform the methods of FIGS. 4 and 5 are performed in substantially less time than the methods of FIGS. 2 and 3, but the same result is still achieved. Saving time means less engineering time, faster manufacturing speeds, and systems are delivered to the customer more quickly.

The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "creating" or "installing" or "booting" or "configuring" or "preparing" or "mounting" or "capturing" or "saving" or "launching" or "downloading" or "expanding" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed, microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that numerous alternative components and embodiments that may be substituted for the particular examples described herein and still fall within the scope of the invention.

What is claimed is:

1. A method of creating and capturing a guest disk image comprising:

creating, by a computer, a plurality of virtual disks from a single storage array, wherein the virtual disks include at least one virtualization software disk and at least one guest disk, and wherein the at least one guest disk is minimally sized for deployment of an operating system and at least one data files and to minimize unused space;

installing, by a computer, virtualization software onto the at least one virtualization software disk, wherein the virtualization software bundles a virtualization software console and a restore environment;

partitioning, by a computer running the virtualization software, the guest disk into at least an operating system (OS) partition and a data partition;

installing, by a computer running the virtualization software, a guest operating system that bundles virtualization drivers onto the OS partition of the guest disk;

booting, by a computer running the virtualization software, the guest operating system through the virtualization software console;

configuring, by a computer, settings of the guest operating system depending on applications or services installed on the guest disk;

booting, by a computer running the virtualization software, the restore environment from the virtualization software console;

capturing, by a computer, a guest disk file system of the OS partition into a first disk image file and a guest disk file system of the data partition into a second image file; and saving, by a computer, the first and second disk image files to the at least one virtualization software disk;

updating, by a computer running the virtualization software, virtualization drivers onto the guest operating system so that the guest operating system communicates with computer hardware through the virtualization software.

2. The method of claim 1, wherein the guest operating system is Windows™ or Linux™.

3. The method of claim 1, wherein the restore environment is a small, lightweight version of Linux™.

4. The method of claim 1, wherein the virtualization software is Unisys s-Par™.

5. The method of claim 1, further comprising:
running, by a computer, Microsoft™ disk imaging tools to capture one or more guest file systems where Microsoft™ Windows™ is to be installed on the guest disk;
verifying, by a computer, the integrity of the one or more captured file systems by reinitializing the guest disk; and
creating, by a computer, a new GUID partition table (GPT), applying, by a computer, the one or more captured image files to the guest disk.

6. The method of claim 5, further comprising:
zeroing-out, by a computer, the guest disk, from a Linux™ environment; and
loading, by a computer, the captured image files onto the zeroed-out guest disk, thereby making all unused space have the value zero.

7. The method of claim 1, further comprising:
configuring, by a computer, the guest disk before installing the guest operating system to the guest disk, wherein configuring includes sizing at least one partition of the guest disk using disk partitioning tools.

8. The method of claim 1, wherein the single array is a RAID created by a RAID utility.

9. The method of claim 1, before preparing the guest disk for capture, further comprising:
installing, by a computer, applications to the guest operating system depending on the applications and services installed on the guest disk.

10. The method of claim 1, wherein the disk partitioning tool sizes the guest disk based on the applications and services installed on the guest disk.

11. The method of claim 1, wherein the disk image file is a compressed file.

12. The method of claim 11, wherein the compressed file includes all file systems blocks of the captured file system for each partition of the guest disk.

13. The method of claim 1, further comprising:
removing, by a computer, temporary files from the mounted file system after mounting the file system of the guest disk in the restore environment; and
changing, by a computer, any digital values of unused space of the mounted file system into zeros.

14. The method of claim 1, further comprising:
mounting, by a computer, the guest disk file system in the restore environment before capturing the guest disk file system into the disk image file.

15. A method of deploying a guest disk comprising:
creating, by a computer, a plurality of virtual disks from a storage array, wherein the virtual disks include at least one guest disk;
partitioning, by a computer, each virtual disk into at least an operating system (OS) partition and a data partition;
launching, by a computer, a virtualization software, wherein the virtualization software bundles a virtualization software console and restore environment;
booting, by a computer, the restore environment;
downloading, by a computer, a OS partition image file and a data partition image file from a storage disk, wherein the OS partition image file and the data partition image file are smaller than a final customer system's OS and data partitions;
expanding, by a computer, the OS partition image file directly onto the guest disk's OS partition using a script run within the restore environment to create an OS file system;
expanding, by a computer, the data partition image file directly onto the guest disk's data partition rising a script pan within the restore environment to create a data file system; and
resizing, by a computer, an OS file system and the data file system to access unused portions of the OS and data partitions based on the size of the final customer system's OS and data partition;
updating, by a computer running the virtualization software, virtualization drivers onto the guest operating system so that the guest operating system communicates with computer hardware through the virtualization software.

16. The method of claim 15, wherein the restore environment is a small, lightweight version of Linux™.

17. The method of claim 15, wherein the restore environment runs in memory of the computer.

18. The method of claim 15, wherein the array is a RAID created by a RAID utility.

19. The method of claim 15, further comprising:
configuring, by a computer, boot settings to boot the installed guest disk operating system instead of the restore environment.

* * * * *